US006987755B2

(12) United States Patent
Monroe et al.

(10) Patent No.: US 6,987,755 B2
(45) Date of Patent: Jan. 17, 2006

(54) SYSTEM AND METHOD FOR USER NOTIFICATION IN A COMMUNICATION SYSTEM

(75) Inventors: Robert L. Monroe, Colorado Springs, CO (US); Narayan P. Menon, Colorado Springs, CO (US); Francis A. Gay, San Diego, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 958 days.

(21) Appl. No.: 09/815,859

(22) Filed: Mar. 22, 2001

(65) Prior Publication Data

US 2002/0136173 A1   Sep. 26, 2002

(51) Int. Cl.
*H04L 12/28* (2006.01)
(52) U.S. Cl. .................. 370/351; 370/328; 370/338
(58) Field of Classification Search ........ 370/229–231, 370/235–236, 395.42, 395.3, 396, 401, 410, 370/466–467, 328, 338, 496, 912–913, 351; 455/412.1–2, 413, 414.3–4
See application file for complete search history.

(56) References Cited

U.S. PATENT DOCUMENTS

| 4,980,907 A | 12/1990 | Raith et al. ................. 379/63 |
| 5,235,632 A | 8/1993 | Raith .......................... 379/59 |
| 5,353,331 A | 10/1994 | Emery et al. ................ 379/58 |
| 5,440,613 A | 8/1995 | Fuentes ....................... 379/60 |
| 5,448,619 A | 9/1995 | Evans et al. ................. 379/58 |
| 5,475,689 A | 12/1995 | Kay et al. ................. 370/95.3 |
| 5,506,887 A | 4/1996 | Emery et al. ................ 379/58 |
| 5,537,610 A | 7/1996 | Mauger et al. .............. 379/58 |
| 5,629,974 A | 5/1997 | Rajala et al. ................ 379/58 |
| 5,664,005 A | 9/1997 | Emery et al. .............. 455/422 |
| 5,713,073 A | 1/1998 | Warsta ...................... 455/56.1 |
| 5,734,699 A | 3/1998 | Lu et al. ...................... 379/58 |
| 5,742,596 A | 4/1998 | Baratz et al. .............. 370/356 |
| 5,742,905 A | 4/1998 | Pepe et al. ................. 455/461 |
| 5,764,955 A | 6/1998 | Doolan ....................... 395/500 |
| 5,771,465 A | 6/1998 | Böjeryd ..................... 455/554 |
| 5,793,762 A | 8/1998 | Penners et al. ............ 370/389 |
| 5,794,009 A | 8/1998 | Coleman et al. ........... 395/500 |
| 5,839,067 A | 11/1998 | Jonsson ..................... 455/422 |

(Continued)

FOREIGN PATENT DOCUMENTS

WO   WO 98/15142   4/1998

(Continued)

OTHER PUBLICATIONS

"A 'Plug and Play' Wireless Architecture Supporting Packet Data and IP Voice/Multimedia Services," U.S. Appl. No. 09/128,553, Inventors: Patrick Apfel, et al., Aug. 3, 1998.

(Continued)

*Primary Examiner*—Chi Pham
*Assistant Examiner*—Viet Le

(57) ABSTRACT

A method for providing user notification includes generating a mobile-terminated message containing at least a portion of information to be provided to a mobile station. The method also includes communicating the mobile-terminated message to a base station. The base station is operable to communicate the mobile-terminated message to the mobile station. The method further includes determining if the mobile station acknowledges successful receipt of the mobile-terminated message. In addition, the method includes generating a mobile-originated message containing at least a portion of the information for communication to a public network if the mobile station fails to acknowledge successful receipt of the mobile-terminated message. The public network is operable to communicate the mobile-originated message to the mobile station.

28 Claims, 5 Drawing Sheets

U.S. PATENT DOCUMENTS

| | | | |
|---|---|---|---|
| 5,862,481 A | 1/1999 | Kulkarni et al. | 455/432 |
| 5,873,031 A | 2/1999 | Griffith et al. | 455/412 |
| 5,887,256 A | 3/1999 | Lu et al. | 455/426 |
| 5,890,064 A | 3/1999 | Widergen et al. | 455/445 |
| 5,901,352 A | 5/1999 | St-Pierre et al. | 455/426 |
| 5,901,359 A | 5/1999 | Malmstrom | 455/461 |
| 5,903,833 A | 5/1999 | Jonsson et al. | |
| 5,924,030 A | 7/1999 | Rautiola et al. | 455/426 |
| 5,943,619 A | 8/1999 | Coyne et al. | 455/433 |
| 5,953,322 A | 9/1999 | Kimball | 370/328 |
| 5,953,651 A | 9/1999 | Lu et al. | 455/408 |
| 5,956,331 A | 9/1999 | Rautiola et al. | 370/338 |
| 5,960,004 A | 9/1999 | Ramström et al. | 370/469 |
| 5,960,344 A | 9/1999 | Mahany | 455/432 |
| 5,978,673 A | 11/1999 | Alperovich et al. | 455/417 |
| 5,999,810 A | 12/1999 | Fuentes | 455/422 |
| 5,999,813 A | 12/1999 | Lu et al. | 455/435 |
| H1836 H | 2/2000 | Fletcher et al. | 455/433 |
| H1837 H | 2/2000 | Fletcher et al. | 455/433 |
| 6,154,650 A | 11/2000 | Abidi et al. | 455/433 |
| 6,570,871 B1 * | 5/2003 | Schneider | 370/356 |
| 6,611,516 B1 * | 8/2003 | Pirkola et al. | 370/352 |
| 6,622,016 B1 * | 9/2003 | Sladek et al. | 455/414.1 |
| 6,633,635 B2 * | 10/2003 | Kung et al. | 379/215.01 |
| 2002/0080719 A1 * | 6/2002 | Parkvall et al. | 370/235 |

FOREIGN PATENT DOCUMENTS

| | | |
|---|---|---|
| WO | WO 00/42790 | 7/2000 |

OTHER PUBLICATIONS

"Method and System for Interworking Voice Bearer Messages Between Circuit-Switched and Packet-Switched Networks," U.S. Appl. No. 09/499,921, Inventors: James Lyon, et al., Feb. 8, 2000.

ITU-T Recommendation H.323, Dec. 5, 1997.

ITU-T Recommendation H.225.0, Nov. 16, 2000.

"System and Method for Call Forwarding in a Communication System," U.S. Appl. No. 09/782,133, Inventor: G. R. Konrad Roeder, Feb. 12, 2001.

* cited by examiner

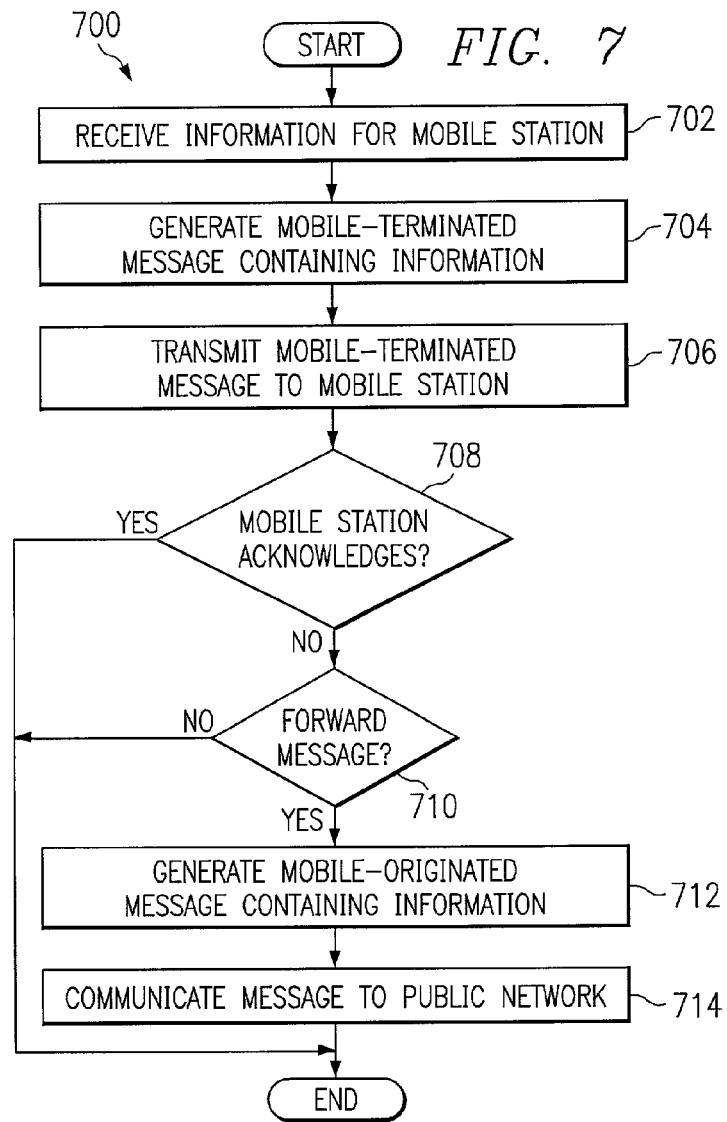
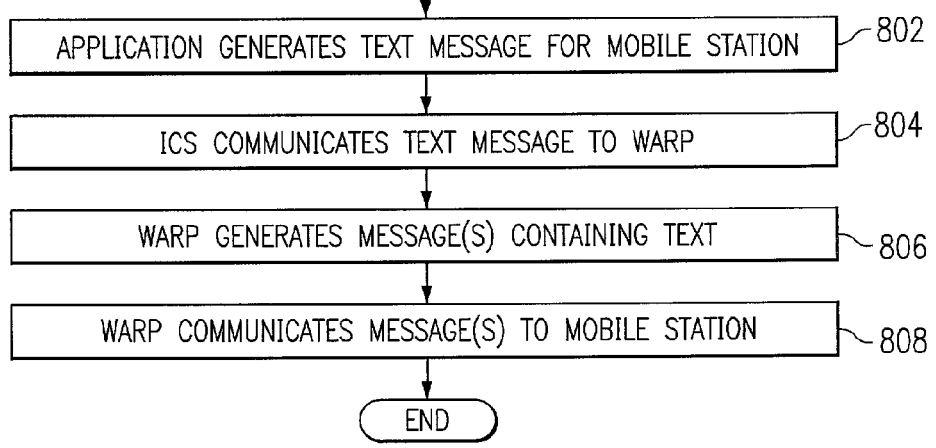

SYSTEM AND METHOD FOR USER NOTIFICATION IN A COMMUNICATION SYSTEM

RELATED APPLICATIONS

This application is related to U.S. application Ser. No. 09/815,858 filed on Mar. 22, 2001 for a "System and Method for User Notification in a Communication System."

TECHNICAL FIELD OF THE INVENTION

This invention relates generally to the field of communication systems, and more particularly to a system and method for user notification in a communication system.

BACKGROUND OF THE INVENTION

The Short Message Service (SMS) is a supplementary feature often supported in communication systems. The Short Message Service typically allows a subscriber in the system to send and receive short text messages to and from other subscribers. For example, a first subscriber may send a text message to a second subscriber asking the second subscriber to call the first subscriber. The Short Message Service typically requires the use of a Service Center in a public network. The Service Center controls the communication of messages to and from the mobile stations, or wireless devices, used by the subscribers. The operators of the public networks typically charge the subscribers for use of the Short Message Service. As a result, the use of the Short Message Service may become rather expensive, particularly if a large number of messages are sent to a mobile station.

SUMMARY OF THE INVENTION

In accordance with the present invention, a system and method for user notification in a communication system are provided that substantially eliminate or reduce disadvantages and problems associated with conventional systems. In particular, user notification messages, such as meeting reminders and voice mail indicators, may be sent to a mobile station without routing the messages through a public network.

In one embodiment of the invention, a system for user notification includes a memory operable to store information to be provided to a mobile station. The system also includes at least one processor operable to generate a mobile-terminated message containing at least a portion of the information to be provided to the mobile station. The processor is also operable to communicate the mobile-terminated message to a base station. The base station is operable to communicate the mobile-terminated message to the mobile station. The processor is further operable to determine if the mobile station acknowledges successful receipt of the mobile-terminated message. In addition, the processor is operable to generate a mobile-originated message containing at least a portion of the information for communication to a public network if the mobile station fails to acknowledge successful receipt of the mobile-terminated message. The public network is operable to communicate the mobile-originated message to the mobile station.

In a particular embodiment of the invention, the mobile-terminated message and the mobile-originated message are Global System for Mobile communication (GSM) Short Message Service (SMS) messages.

In another embodiment of the invention, a method for providing user notification includes generating a mobile-terminated message containing at least a portion of information to be provided to a mobile station. The method also includes communicating the mobile-terminated message to a base station. The base station is operable to communicate the mobile-terminated message to the mobile station. The method further includes determining if the mobile station acknowledges successful receipt of the mobile-terminated message. In addition, the method includes generating a mobile-originated message containing at least a portion of the information for communication to a public network if the mobile station fails to acknowledge successful receipt of the mobile-terminated message. The public network is operable to communicate the mobile-originated message to the mobile station.

Numerous technical advantages are provided according to various embodiments of the present invention. Particular embodiments of the invention may exhibit none, some, or all of the following advantages depending on the implementation of the invention. For example, in one embodiment, a system for user notification is provided. In particular, the system may allow a mobile station to receive user notification messages from applications such as calendar applications and electronic mail systems. The notifications may, for example, inform the user that a meeting is scheduled to occur or that an e-mail message has arrived. The message may also indicate that a voice mail system has received a voice message for a telephone associated with the subscriber, such as the subscriber's desk telephone. This allows the subscriber to receive useful information at the mobile station in a fast and convenient manner.

Another advantage of at least some embodiments of the invention is that billing may be reduced for the subscriber. In one embodiment of the invention, the mobile station may receive the user notification messages without requiring the messages to be communicated through a Service Center or other component of a public network. For example, a private or corporate network may attempt to communicate the user notification message to the mobile station without requiring the message to be routed through the public network. If the message is successfully delivered to the mobile station, the subscriber need not be charged for the service by the public network. If the message cannot be delivered to the mobile station by the private network, the private network may or may not communicate the message to the public network for delivery to the mobile station. This reduces the number of messages that are sent through the public network, which helps to reduce the cost of providing the user notification messages to the subscriber.

Other technical advantages are readily apparent to one of skill in the art from the attached figures, description, and claims.

BRIEF DESCRIPTION OF THE DRAWINGS

To provide a more complete understanding of the present invention and features and advantages thereof, reference is made to the following description in conjunction with the accompanying drawings, in which:

FIG. 7 is a flow diagram illustrating an exemplary method for delivering a user notification message to a mobile station according to the teachings of the present invention;

FIG. 8 is a flow diagram illustrating an exemplary method for delivering a user notification from an application to a mobile station according to the teachings of the present invention.

DETAILED DESCRIPTION OF THE INVENTION

Figure 1:
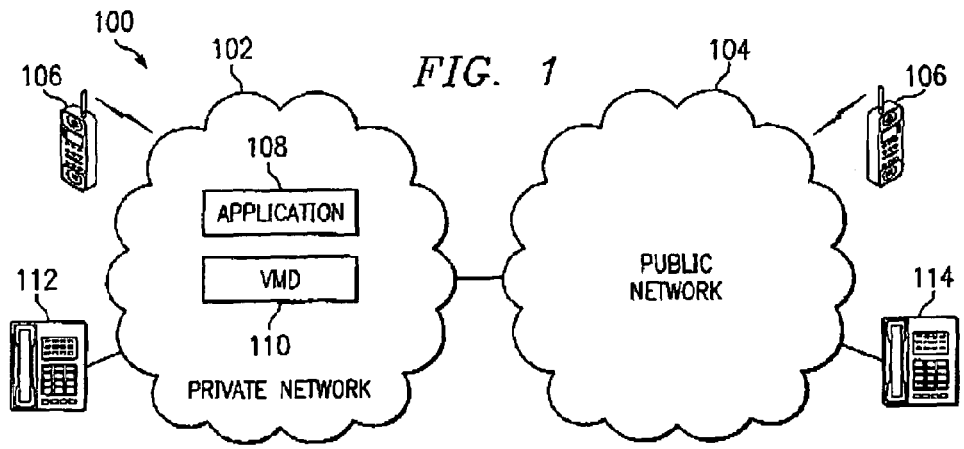
FIG. 1 is a block diagram illustrating an exemplary user notification system constructed according to the teachings of the present invention.

FIG. 1 is a block diagram illustrating an exemplary user notification system 100 constructed according to the teachings of the present invention. In the illustrated embodiment, system 100 includes one or more private networks 102 and one or more public networks 104. Other embodiments of system 100 may be used without departing from the scope of the present invention.

In one aspect of operation, mobile station 106 receives user notification messages from private network 102 and/or public network 104. The notification messages may, for example, be initiated by an application 108 executing in private network 102, such as a calendar program or an electronic mail program. The user notification messages may also be initiated when a voice mail device (VMD) 110 in private network 102 receives and stores a voice message for a telephone 112 associated with mobile station 106. In one embodiment, when the mobile station 106 is registered with, or communicating with, private network 102, private network 102 may communicate the user notification messages to mobile station 106 without routing the messages through public network 104. If private network 102 cannot deliver the message to mobile station 106, private network 102 may or may not communicate the message to public network 104 for delivery to mobile station 106. This allows the subscriber to receive information at mobile station 106 in a fast and convenient manner. It also reduces the number of messages that may be sent through public network 104, which helps to reduce the cost of providing the user notification messages to the subscriber using mobile station 106.

Private network 102 is coupled to public network 104. In this document, the term "couple" refers to any direct or indirect communication between two or more elements, whether or not those elements are in physical contact with one another. Also, in this document, the phrase "private network" refers to any network or portion of a network that communicates with and that can be managed apart from public network 104. Private network 102 facilitates communication between mobile stations 106 and/or telephones 112 communicating with private network 102. Private network 102 also facilitates communication between mobile station 106a or telephone 112 and public network 104. In addition, private network 102 facilitates the communication of user notification messages to and from mobile station 106. Private network 102 may, for example, communicate the messages directly to a mobile station 106, or private network 102 may communicate the messages to public network 104 for delivery to mobile station 106. The messages may be generated by an application 108 or in response to voice mail device 110 receiving a voice message for telephone 112. Private network 102 may comprise any hardware, software, firmware, or combination thereof operable to facilitate communication between mobile stations 106, telephone 112, and/or telephone 114. Private network 102 may, for example, comprise an internal corporate network.

Public network 104 is coupled to private network 102. Public network 104 facilitates communication between telephone 114 and/or mobile stations 106b communicating with public network 104. Public network 104 may also facilitate communication between telephone 114 or mobile station 106b and private network 102. In addition, public network 104 facilitates the communication of user notification messages to and from mobile station 106. Public network 104 may, for example, communicate the messages directly to a mobile station 106, or public network 104 may communicate the messages to private network 102 for delivery to mobile station 106. Public network 104 may comprise any hardware, software, firmware, or combination thereof operable to facilitate communication between telephones 114, telephones 112, and/or mobile stations 106. Public network 104 may, for example, comprise a Global System for Mobile communication (GSM) network.

Application 108 represents one or more applications that may generate and/or communicate user notification messages to a mobile station 106. As used in this document, the term "application" refers to a set of instructions, procedures, functions, objects, classes, instances, and/or related data adapted for implementation in hardware, software, firmware, or a combination thereof. Also, in this document, the phrases "user notification message" and "notification message" refer to a message operable to deliver textual and/or visual information to mobile station 106 to be provided to the subscriber using mobile station 106. A user notification message may have any suitable format, structure, and/or arrangement of information. In one embodiment, application 108 represents a software application operable to be executed by a processor. Application 108 may comprise any application, and the notification messages communicated to mobile station 106 may comprise any message. For example, applications 108 may include a calendar and electronic mail program, such as MICROSOFT OUTLOOK or OUTLOOK EXPRESS. Applications 108 may also include a Web-based interface through which a user may access private network 102 and provide messages for delivery to a mobile station 106. The user notification messages may comprise a text message reminding a subscriber of an upcoming appointment or a text message indicating that e-mail has arrived for the subscriber. Other applications 108 and/or user notification messages may be used without departing from the scope of the present invention.

Voice mail device 110 is operable to receive and store voice messages for one or more telephones 112. In one embodiment, when voice mail device 110 receives a voice message for a telephone 112 associated with mobile station 106, mobile station 106 may receive a user notification message indicating that a voice message has arrived. This may allow, for example, the subscriber using mobile station 106 to access voice mail device 110 and retrieve the voice message. Voice mail device 110 may comprise any hardware, software, firmware, or combination thereof operable to store and facilitate retrieval of voice messages.

In one aspect of operation, user notification messages for mobile station 106 may be produced by application 108 and/or in response to voice mail device 110 receiving a voice message. These messages are communicated to mobile station 106, so these messages may be referred to as "mobile-terminated messages." When a mobile-terminated message has been generated, private network 102 attempts to deliver the message to mobile station 106. In one embodiment, private network 102 attempts to deliver the message to mobile station 106 without routing the message through public network 104. If mobile station 106 acknowledges the successful receipt of the message, private network 102 need take no further action.

When mobile station 106 fails to acknowledge the message after one or multiple delivery attempts by private network 102, private network 102 may store the message for later delivery to mobile station 106, or private network 102 may discard the message. Private network 102 may also forward the message to public network 104 for delivery to mobile station 106. In one embodiment, private network 102 forwards the message to public network 104 by generating a "mobile-originated message." Mobile-originated messages appear to come from a mobile station 106, although other components of private network 102 may generate messages that appear to public network 104 to be mobile-originated messages. Also, private network 102 may forward all or a portion of the unsuccessfully delivered messages to public network 104 for delivery to mobile station 106. In a particular embodiment, private network 102 may select which messages to forward to public network 104 based on the identity of the subscriber or mobile station 106 receiving the message, the type of message being sent, the priority of the message being sent, and/or any other criteria. For example, one of a plurality of private networks 102 may be prohibited from forwarding any messages to public network 104. Private network 102 could also forward messages for certain subscribers to public network 104 but not for other subscribers, and/or private network 102 could forward messages having a higher level of importance to public network 104 without forwarding other types of messages.

In another aspect of operation, mobile station 106 may produce messages for delivery to another mobile station 106 communicating with private network 102, application 108, public network 104, or another component of system 100. These are mobile-originated messages. When private network 102 receives a mobile-originated message, private network 102 attempts to deliver the message to the destination. Private network 102 may deliver the message to its destination, such as application 108 or another mobile station 106 in private network 102. Private network 102 may also route the messages to public network 104 if the destination is outside private network 102. In one embodiment, private network 102 may attempt to deliver the message to its destination without routing the message through public network 104. Private network 102 could further discard the message when the mobile station 106 is not authorized to send the message or the destination is not authorized to receive the message.

The messages communicated in system 100 may comprise any suitable message. In one embodiment, the messages communicated to and/or from mobile station 106 comprise short messages supported by the GSM Short Message Service. In another embodiment, multiple message formats may be supported in system 100. For example, mobile station 106 could support the GSM Short Message Service protocols, messages from application 108 could use a Mobility Management over Internet Protocol (MMIP) protocol, messages indicating that voice mail device 110 has received a voice message could use the International Telecommunications Union-Telecommunications (ITU-T) H.450.7 protocol, and private network 102 and public network 104 could communicate using the GSM Mobility Application Part (MAP) protocols. In this embodiment, private network 102 and/or public network 104 may perform interworking functions to translate between the different protocols.

Although FIG. 1 illustrates one embodiment of system 100, other embodiments of system 100 may be used without departing from the scope of the present invention. For example, any number of private networks 102 and/or public networks 104 may be used in system 100. Also, any number and/or types of applications 108 may be used in system 100, and these applications 108 may generate any suitable user notification message for mobile station 106.

Figure 2:
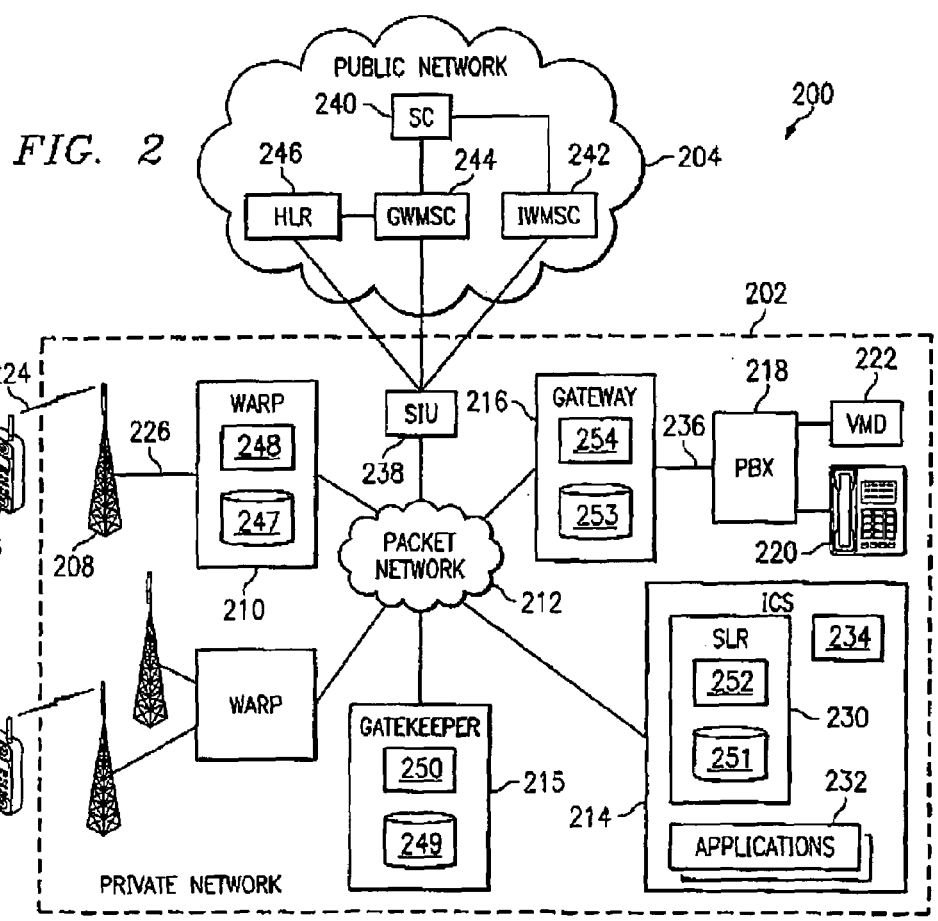
FIG. 2 is a block diagram illustrating additional details of one embodiment of the user notification system of FIG. 1 constructed according to the teachings of the present invention.

FIG. 2 is a block diagram illustrating additional details of one embodiment of the user notification system of FIG. 1 constructed according to the teachings of the present invention. In the illustrated embodiment, system 200 includes a private network 202 and a public network 204. Private network 202 includes a mobile station 206, a base station (BTS) 208, a Wireless Adjunct Internet Platform (WARP) 210, a packet network 212, an integrated communications server 214, a gatekeeper 215, a gateway 216, and a Private Branch Exchange (PBX) 218. Other embodiments of system 200 may be used without departing from the scope of the present invention.

In one aspect of operation, mobile station 206 receives user notification messages from private network 202. The user notification messages may, for example, be initiated by an application 232 executing on integrated communications server 214. The user notification messages may also indicate that a voice mail device 222 has received a voice message for a telephone 220 associated with mobile station 206. Private network 202 may communicate the notification message to mobile station 206 without routing the message through public network 204. If private network 202 cannot deliver the message to mobile station 206, private network 202 may or may not communicate the message to public network 204 for delivery to mobile station 206.

Mobile station 206 provides voice and/or data services to a subscriber of private network 202. Mobile station 206 communicates with private network 202 over a wireless interface 224. Mobile station 206 may comprise any wireless device operable to communicate with and roam within private network 202. Mobile station 206 may, for example, comprise a mobile telephone or a computer coupled to a wireless modem or radio unit. In one embodiment, mobile station 206 comprises a dual mode mobile station operable to communicate with private network 202 using a first protocol and with public network 204 using a second protocol. In a particular embodiment, mobile station 206 communicates with private network 202 using GSM protocols and with public network 204 using Electronic Industries Alliance/Telecommunication Industry Association (EIA/TIA) IS-136 protocols, and mobile station 206 comprises a dual mode GSM/IS-136 mobile handset. Other embodiments of mobile station 206 may be used without departing from the scope of the present invention.

Base station 208 is coupled to WARP 210. Base station 208 provides bi-directional communication with mobile stations 206 in a specified geographic area over wireless interface 224. Base station 208 also transfers information between mobile station 206 and WARP 210. Base station 208 may comprise any hardware, software, firmware, or combination thereof operable to communicate with mobile stations 206 over a wireless interface 224. Base station 208 may, for example, comprise one or more transceivers operable to exchange circuit-switched and/or packet-switched information with mobile station 206.

Wireless interface 224 facilitates communication between mobile station 206 and base station 208. Wireless interface 224 may comprise any wireless interface operable to transfer circuit-switched and/or packet-switched information between mobile station 206 and base station 208. Interface 224 may, for example, comprise a GSM General Packet Radio Service (GSM/GPRS) interface or a GSM Enhanced Data rates for GSM Evolution (GSM/EDGE) interface.

WARP 210 is coupled to base station 208 by an interface 226 and to packet network 212. WARP 210 facilitates communication between mobile stations 206 and packet network 212 by transporting voice and/or data information between base station 208 and packet network 212. WARP 210 may be referred to as a "wireless platform" because it supports communication between wireless devices such as mobile station 206 and system 200. In one embodiment, WARP 210 communicates with mobile station 206 through base station 208 using a circuit-switched protocol, and WARP 210 communicates with packet network 212 using a packet-switched protocol. In this embodiment, WARP 210 also performs an interworking function to translate between the circuit-switched and packet-switched protocols. For example, WARP 210 may convert between the GSM protocols used by mobile station 206 and the ITU-T H.323 protocols used by integrated communications server 214, gatekeeper 215, and gateway 216. WARP 210 further packetizes information from mobile station 206 into datagrams for transmission over packet network 212, and WARP 210 depacketizes information contained in datagrams received over packet network 212.

In addition, WARP 210 facilitates communication of user notification messages to and from mobile station 206. WARP 210 may, for example, receive a user notification message from a component in private network 202, such as integrated communications server 214, and attempt to communicate the message to mobile station 206. If mobile station 206 acknowledges receipt of the message, WARP 210 may not communicate the message to public network 204. If mobile station 206 fails to acknowledge receipt of the message, WARP 210 may communicate the message to public network 204, and public network 204 may attempt to deliver the message to mobile station 206. WARP 210 may further receive a message from mobile station 206 and attempt to communicate the message to the destination. WARP 210 may comprise any hardware, software, firmware, or combination thereof operable to communicate user notification messages to and/or receive messages from mobile station 206. In the illustrated embodiment, WARP 210 includes a memory 247 and a processor 248. Memory 247 may comprise any suitable hardware, software, firmware, or combination thereof operable to store and facilitate retrieval of information. For example, memory 247 may store software instructions executed by processor 248 to perform the described functions of WARP 210. Memory 247 may also store other information, such as the information being communicated to mobile station 206 from application 232.

In one embodiment, WARP 210 communicates the notification messages to mobile station 206 using GSM Short Message Service short messages. For example, WARP 210 may encapsulate the user notification message into a GSM mobile-terminated message and communicate the mobile-terminated message to one or more base stations 208. If mobile station 206 fails to acknowledge receipt of the mobile-terminated message, WARP 210 may encapsulate the user notification message into a GSM mobile-originated message and communicate the mobile-originated message to public network 204.

Interface 226 is coupled to base station 208 and WARP 210. Interface 226 may comprise any interface operable to transfer circuit-switched and/or packet-switched information between base station 208 and WARP 210. Interface 226 may, for example, comprise a GSM Abis wireline interface.

Packet network 212 is coupled to WARP 210, integrated communications server 214, gatekeeper 215, and gateway 216. Packet network 212 transports datagrams, such as Internet Protocol (IP) packets, from one network address in packet network 212 to another network address. In addition, packet network 212 may be coupled to and communicate with one or more public networks 204, such as the Internet or a public land mobile network. Packet network 212 may comprise any packet-switched network. Packet network 212 may, for example, comprise a Local Area Network (LAN), a Wide Area Network (WAN), a Metropolitan Area Network (MAN), a portion of a global computer network such as the Internet, or any other communications system or systems at one or more locations.

In the illustrated embodiment, integrated communications server 214 includes a subscriber location register (SLR) 230 and one or more applications 232. Although FIG. 2 illustrates integrated communications server 214 as comprising both of these components, any or all of these components may be implemented on a separate platform or platforms without departing from the scope of the present invention.

Subscriber location register 230 stores subscriber management information for mobile stations 206. For example, subscriber location register 230 may store general subscriber management information downloaded from public network 204 when mobile station 206 roams into system 200. Subscriber location register 230 may also store each subscriber's extension number, direct dial number, and any other information that is specific to private network 202. Subscriber location register 230 may further store an indication of whether a subscriber using a mobile station 206 is authorized to communicate and/or receive user notification messages. In addition, subscriber location register 230 may store an identification of a default WARP 210 to which user notification messages will be sent if no other WARP 210 is currently serving a mobile station 206. Subscriber location register 230 may comprise any hardware, software, firmware, or combination thereof operable to store subscriber management information. Subscriber location register 230 may, for example, comprise a SUN workstation with a database. In the illustrated embodiment, subscriber location register 230 includes a memory 251 and a processor 252. Memory 251 may store software instructions executed by processor 252 to perform the described functions of subscriber location register 230.

Application 232 represents one or more applications that may generate and/or communicate user notification messages to a mobile station 206. In one embodiment, applications 232 represent software applications operable to be executed by a processor 234. Applications 232 may, for example, include a calendar and electronic mail program, such as MICROSOFT OUTLOOK or OUTLOOK EXPRESS. Applications 232 may also include a Web-based interface to integrated communications server 214 through which one subscriber can provide a message for another subscriber. The user notification messages may comprise a message reminding a subscriber of an appointment, a message indicating that e-mail has arrived, or a message entered through the Web-based interface. Other applications 232 and/or user notification messages may be used without departing from the scope of the present invention.

Gatekeeper 215 provides call control services for mobile stations 206, WARPs 210, and gateway 216. For example, gatekeeper 215 tracks the location of mobile stations 206, and gatekeeper 215 routes calls and messages for a mobile station 206 to and from the WARP 210 currently serving that mobile station 206. This allows subscribers using mobile stations 206 to roam between geographic areas covered by different base stations 208. Gatekeeper 215 also performs address translation to convert the phone number associated with mobile station 206 to a network address of WARP 210 serving that mobile station 206. Gatekeeper 215 may comprise any hardware, software, firmware, or combination thereof operable to provide call control services. In the illustrated embodiment, gatekeeper 215 includes a memory 249 and a processor 250. Memory 249 may store software instructions executed by processor 250 to perform the described functions of gatekeeper 215.

Gateway 216 is coupled to packet network 212 and PBX 218. Gateway 216 may also be coupled to a public network, such as a public switched telephone network. Gateway 216 transfers information between packet network 212 and PBX 218. In one embodiment, gateway 216 communicates with packet network 212 using a packet-switched protocol and with PBX 218 using a circuit-switched protocol. In this embodiment, gateway 216 also performs an interworking function to translate between the packet-switched and circuit-switched protocols. In a particular embodiment, gateway 216 converts between the ITU-T H.323 protocols used by WARP 210, integrated communications server 214, and gatekeeper 215 and the circuit-switched protocols used by PBX 218. In addition, gateway 216 packetizes information into datagrams for transmission over packet network 212, and gateway 216 depacketizes information contained in datagrams received over packet network 212. Gateway 216 may communicate bearer and signaling information to PBX 218 over an interface 236. Gateway 216 may comprise any hardware, software, firmware, or combination thereof operable to facilitate communication between packet network 212 and PBX 218. In the illustrated embodiment, gateway 216 includes a memory 253 and a processor 254. Memory 253 may store software instructions executed by processor 254 to perform the described functions of gateway 216.

In addition, gatekeeper 215 and/or gateway 216 may receive an indication from voice mail device 222 that a voice message has been received for a telephone 220 associated with mobile station 206. Gatekeeper 215 and/or gateway 216 may generate a user notification message for mobile station 206 informing the subscriber of the voice message, or gatekeeper 215 and/or gateway 216 may generate a signal instructing WARP 210 to generate the message.

PBX 218 is coupled to gateway 216, one or more telephones 220, and one or more voice mail devices 222. PBX 218 may also be coupled to one or more public networks, such as a public land mobile network and a public switched telephone network. PBX 218 transfers information between telephones 220 and/or between gateway 216 and telephones 220. PBX 218 may comprise any circuit-switched and/or packet-switched network operable to facilitate communication between telephone 220, voice mail device 222, and gateway 216.

Gateway 216 and PBX 218 communicate over an interface 236. Interface 236 may comprise any wireless or wireline interface operable to facilitate communication between gateway 216 and PBX 218. Interface 236 may, for example, comprise one or more trunk interfaces or one or more line interfaces.

Telephone 220 is coupled to PBX 218. Telephone 220 may comprise any wireline or wireless telephonic device operable to communicate with PBX 218. In this document, the phrase "telephonic device" refers to any hardware, software, firmware, or combination thereof operable to provide voice phone services. Telephone 220 may, for example, comprise a fixed telephone, a wireless mobile station, a voice over packet telephone, or a computer executing a telephonic application.

Voice mail device 222 is coupled to PBX 218. Voice mail device 222 is operable to receive and store voice messages associated with a telephone 220. In one embodiment, voice mail device 222 is also operable to inform gatekeeper 215 and/or gateway 216 that a telephone 220 associated with a mobile station 206 has received a voice message. Gatekeeper 215 and/or gateway 216 may then produce a user notification message informing mobile station 206 that a voice message has been received, and gatekeeper 215 may route the message to WARP 210 serving that mobile station 206. Voice mail device 222 may comprise any hardware, software, firmware, or combination thereof operable to store voice messages. Although FIG. 2 illustrates telephone 220 and voice mail device 222 as separate components, telephone 220 and voice mail device 222 could also be combined into a single physical unit.

In one embodiment, private network 202 and public network 204 may use different communications protocols. To facilitate communication between private network 202 and public network 204, a Signaling System 7—Internet Protocol Interworking Unit (SIU) 238 is coupled to packet network 212 and to public network 204. SS7-IP interworking unit 238 allows private network 202 to communicate and exchange signaling messages with public network 204. In a particular embodiment, SS7-IP interworking unit 238 depacketizes messages contained in data packets received over packet network 212 and generates Signaling System 7 (SS7) Message Transfer Part (MTP) messages used by public network 204. SS7-IP interworking unit 238 also packetizes messages contained in SS7 MTP messages into data packets for transmission over packet network 212. In addition, SS7-IP interworking unit 238 may perform a routing function to route datagrams through packet network 212. SS7-IP interworking unit 238 may comprise any hardware, software, firmware, or combination thereof operable to facilitate communication between packet network 212 and public network 204.

In the illustrated embodiment, public network 204 includes a Short Message Service service center (SC) 240, an interworking mobile switching center (IWMSC) 242, a gateway mobile switching center (GWMSC) 244, and a home location register (HLR) 246. Although FIG. 2 illustrates the components of public network 204 as residing on separate platforms, one or more of these components may be combined into a single platform without departing from the scope of the present invention.

Short Message Service service center 240 is operable to control the delivery of messages to mobile stations 206 in public network 204. For example, service center 240 may receive a message for a first mobile station 206 from private network 202 or from a second mobile station 206, and service center 240 routes the message to the first mobile station 206. In one embodiment, service center 240 is operable to control the delivery of GSM Short Message Service messages. Service center 240 may comprise any hardware, software, firmware, or combination thereof operable to manage the delivery of messages to mobile stations 206.

Interworking mobile switching center 242 is coupled to SS7-IP interworking unit 238 and service center 240. In one embodiment, interworking mobile switching center 242 is coupled to SS7-IP interworking unit 238 using a GSM MAP/H link. Interworking mobile switching center 242 receives messages to be communicated to a mobile station 206 from private network 202 or another mobile station 206. In one embodiment, interworking mobile switching center 242 and service center 240 may communicate using proprietary protocols, and interworking mobile switching center 242 also performs an interworking function to convert between the protocol used by SS7-IP interworking unit 238 and the protocol used by service center 240. In one embodiment, interworking mobile switching center 242 converts between the GSM MAP protocol used by SS7-IP interworking unit 238 and the proprietary protocol used by service center 240. Interworking mobile switching center 242 may comprise any hardware, software, firmware, or combination thereof operable to interwork messages between SS7-IP interworking unit 238 and service center 240.

Gateway mobile switching center 244 is coupled to SS7-IP interworking unit 238, service center 240, and home location register 246. Gateway mobile switching center 244 could also be coupled to another public network, such as another public land mobile network. In one embodiment, gateway mobile switching center 244 is coupled to SS7-IP interworking unit 238 using a GSM MAP/H link and to home location register 246 using a GSM MAP/C link. Gateway mobile switching center 244 receives messages to be communicated to a mobile station 206 from service center 240. In one embodiment, gateway mobile switching center 244 and service center 240 communicate using proprietary protocols, and gateway mobile switching center 244 also performs an interworking function to convert between the protocol used by SS7-IP interworking unit 238, such as the GSM MAP protocol, and the protocol used by service center 240. Gateway mobile switching center 244 may comprise any hardware, software, firmware, or combination thereof operable to interwork messages between SS7-IP interworking unit 238 and service center 240.

Home location register 246 is coupled to SS7-IP interworking unit 238 and gateway mobile switching center 244. In one embodiment, home location register 246 is coupled to SS7-IP interworking unit 238 by a GSM MAP/C and/or MAP/D link. Home location register 246 handles location management functions for public network 204, storing the location of a mobile station 206. When mobile station 206 moves into private network 202, home location register 246 stores which WARP 210 is currently serving mobile station 206. If mobile station 206 roams between two WARPs 210, home location register 246 updates the location of mobile station 206. When mobile station 206 leaves private network 202, home location register 246 stores the location of mobile station 206 within public network 204. Home location register 246 also transfers general subscriber management information to subscriber location register 230 when a mobile station 206 registers with a WARP 210. Home location register 246 may comprise any hardware, software, firmware, or combination thereof operable to store subscriber management information. Home location register 246 may, for example, comprise a SUN workstation with a database.

In one aspect of operation, a subscriber using mobile station 206 may receive user notification messages from private network 202 and/or public network 204. Mobile station 206 may, for example, receive a message from an application 232. When an application 232 generates a message for mobile station 206, integrated communications server 214 communicates the message to WARP 210 serving the mobile station 206. In one embodiment, integrated communications server 214 communicates an MMIP message to WARP 210, and the MMIP message contains the text of the message being sent to mobile station 206. The MMIP message may also contain one or more flags, which can be used by WARP 210 to determine whether to forward the message to public network 204 if WARP 210 cannot successfully deliver the message to mobile station 206. When WARP 210 receives the message from integrated communications server 214, WARP 210 may acknowledge receipt of the message. WARP 210 also determines which base station 208 coupled to WARP 210 is communicating with mobile station 206. WARP 210 generates a mobile-terminated message for mobile station 206, and the mobile-terminated message contains the text of the message being sent to mobile station 206. In one embodiment, WARP 210 generates a GSM mobile-terminated short message. WARP 210 then communicates the mobile-terminated message to base station 208, and base station 208 communicates the message to mobile station 206.

If mobile station 206 acknowledges receipt of the message, WARP 210 may inform integrated communications server 214 of the delivery, or WARP 210 may take no further action. If mobile station 206 fails to acknowledge receipt of the message, WARP 210 may examine the flag in the message received from integrated communications server 214. When the flag indicates that WARP 210 may forward the message to public network 204, WARP 210 generates a mobile-originated message containing the text of the message from integrated communications server 214. In one embodiment, WARP 210 generates a GSM mobile-originated short message. WARP 210 then communicates the mobile-originated message to interworking mobile switching center 242, and service center 240 in public network 204 attempts to deliver the message to mobile station 206.

Mobile station 206 may also receive a message indicating that voice mail device 222 has received a voice message for a telephone 220 associated with mobile station 206. When voice mail device 222 receives a voice message, gatekeeper 215 and/or gateway 216 detects the receipt of the message and generates a signal for WARP 210 informing WARP 210 of the voice message. In a particular embodiment, gatekeeper 215 and/or gateway 216 generates an ITU-T H.450 Message Waiting Indicator (MWI) message. The MWI message may include an "activate" or "deactivate" value. The activate value indicates that one or more voice messages have been received by voice mail device 222, and the deactivate value indicates that there are no longer any voice messages waiting for the subscriber. The MWI message may also include other or additional information, such as the number of voice messages waiting for the subscriber, the address or phone number of the caller who left the voice message, the time the voice message was received, and the priority of the voice message.

When WARP 210 receives the MWI message, WARP 210 sends an MMIP message to subscriber location register 230, informing subscriber location register 230 of the activation or deactivation status of the voice mail device 222. Subscriber location register 230 determines whether a user notification message should be sent to mobile station 206. In one embodiment, subscriber location register 230 determines whether a subscriber is authorized to receive this type of message. Subscriber location register 230 may also determine whether the subscriber's subscription allows the subscriber to receive an indication for every new voice message, or whether the subscriber may receive an indication only when the first new voice message is received after the subscriber checks the messages and not when subsequent new messages are received. Using this information, subscriber location register 230 instructs WARP 210 to generate or not generate a message for mobile station 206.

If instructed to produce the notification message, WARP 210 may generate a mobile-terminated message containing an indication that a voice message has arrived, and the message may contain any of the other or additional information from the MWI message received from gatekeeper 215 and/or gateway 216. WARP 210 communicates the mobile-terminated message to mobile station 206. WARP 210 may also generate and communicate a mobile-originated message to public network 204 if mobile station 206 fails to acknowledge receipt of the mobile-terminated message.

Mobile station 206 may further receive a message from public network 204. For example, public network 204 may be operable to store voice messages for calls placed to mobile station 206, and public network 204 may generate messages when a voice message is received for mobile station 206. WARP 210 receives the message through SS7-IP interworking unit 238, and WARP 210 communicates the message to mobile station 206.

In addition, mobile station 206 may generate a mobile-originated message for communication to another component of private network 202 or public network 204. If the message is destined for application 232, gatekeeper 215, or gateway 216, WARP 210 may generate and communicate an MMIP message containing the text of the message from mobile station 206. If the message is destined for public network 204, WARP 210 may generate and communicate a GSM MAP message containing the text of the message from mobile station 206.

When a user notification message has been generated for a mobile station 206 that is not registered with private network 202, the message could be routed to a default WARP 210 stored in subscriber location register 230. When WARP 210 receives the message, WARP 210 could immediately forward the message to public network 204. WARP 210 could also attempt to deliver the message to mobile station 206, even though mobile station 206 was not registered with private network 202 when the message was generated.

Although FIG. 2 illustrates one embodiment of system 200, various changes may be made to system 200 without departing from the scope of the present invention. For example, any number of base stations 208 may be coupled to each WARP 210, and any number of WARPs 210 may be coupled to packet network 212. Also, although FIG. 2 illustrates a PBX 218 coupled to gateway 216, other telephone systems may be coupled to gateway 216, such as a Key System, a central office switch, a wireless telephone switch, a packet-based soft switch, or any other circuit-switched and/or packet-switched system. Further, although integrated communications server 214, gatekeeper 215, and gateway 216 are illustrated as separate entities, one or more may be combined into an integrated platform. In addition, messages for mobile station 206 may be produced by an electronic mail server or other computing device in system 200 and communicated to integrated communications server 214 or WARP 210. Beyond that, FIG. 2 illustrates WARP 210, gatekeeper 215, gateway 216, and subscriber location register 230 as containing a memory and a processor. In another embodiment, the functions of one or more of these components may be incorporated into logic encoded on at least one computer processable medium. The logic may be encoded in hardware, software instructions, and/or firmware instructions stored in any suitable device such as, for example, a random access memory (RAM), a read-only memory (ROM), an application-specific integrated circuit (ASIC), or a field programmable gate array (FPGA). Other changes may be made to system 200 without departing from the scope of the present invention.

Figure 3:
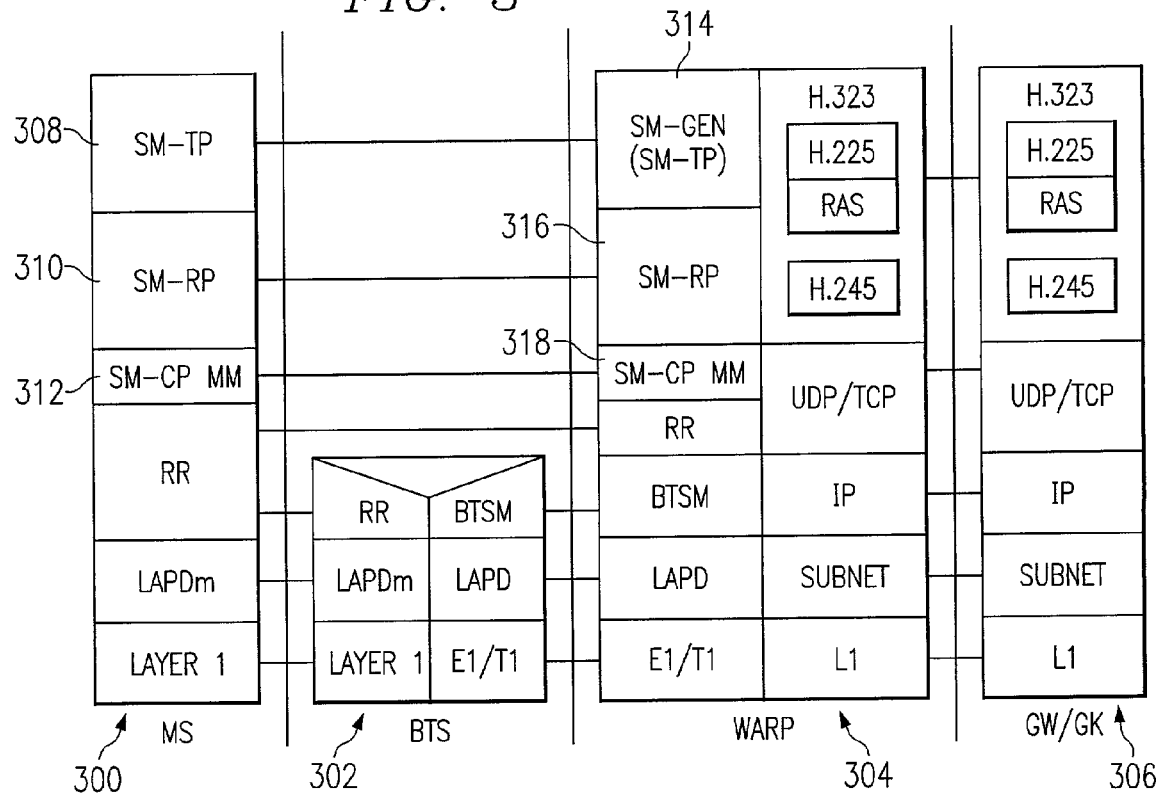
FIG. 3 is a block diagram illustrating an exemplary protocol architecture for delivering a user notification message from an application to a mobile station in a private network constructed according to the teachings of the present invention.

FIG. 3 is a block diagram illustrating an exemplary protocol architecture for delivering a user notification message from application 232 to mobile station 208 in private network 202 constructed according to the teachings of the present invention. In the illustrated embodiment, mobile station 206 has an associated protocol stack 300, base station 208 has an associated protocol stack 302, WARP 210 has an associated protocol stack 304, and gatekeeper 215 and/or gateway 216 has an associated protocol stack 306.

To facilitate the transport of application messages to and from mobile station 206, mobile station 206 includes a Short Message Transport Protocol (SM-TP) layer 308, a Short Message Relay Protocol (SM-RP) layer 310, and a Short Message Control Protocol and Mobility Management (SM-CP MM) layer 312. Similarly, WARP 210 includes a Short Message Generator layer 314, a Short Message Relay Protocol layer 316, and a Short Message Control Protocol and Mobility Management layer 318.

Layers 308–312 in mobile station 206 and layers 314–318 in WARP 210 support the delivery of short messages from an application 232 to mobile station 206. WARP 210 may receive a message from an application 232 over packet network 212 and generate a mobile-terminated message containing the text of the message from application 232. WARP 210 may then communicate the mobile-terminated message to mobile station 206 through base station 208.

Figure 4:
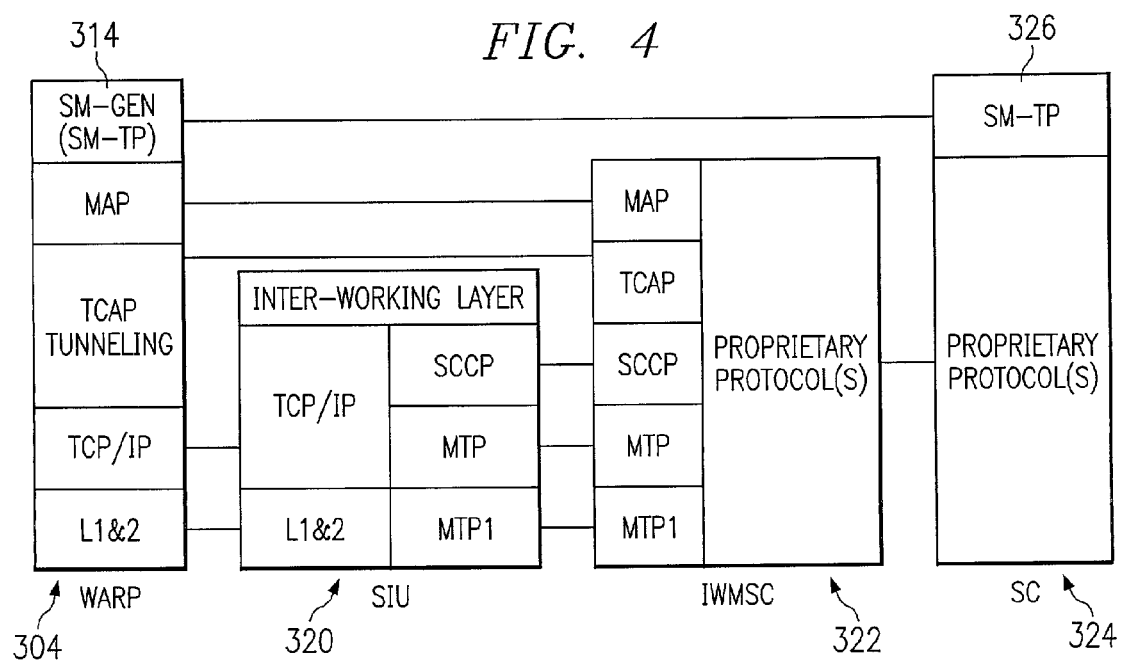
FIG. 4 is a block diagram illustrating an exemplary protocol architecture for delivering a user notification from an application to a mobile station in a public network constructed according to the teachings of the present invention.

FIG. 4 is a block diagram illustrating an exemplary protocol architecture for delivering a user notification from application 232 to mobile station 206 in public network 204 constructed according to the teachings of the present invention. In the illustrated embodiment, SS7-IP interworking unit 238 has an associated protocol stack 320, interworking mobile switching center 242 has an associated protocol stack 322, and service center 240 has an associated protocol stack 324.

To facilitate the transport of application messages between private network 202 and public network 204, WARP 210 includes Short Message Generator layer 314, and service center 240 includes a Short Message Transport Layer Protocol 326. Layers 314 and 326 support the delivery of short messages from an application 232 to mobile station 206 through public network 204. When mobile station 206 fails to acknowledge the reception of a mobile-terminated message communicated by WARP 210, WARP 210 uses the message received from application 232 and determines whether the message may be forwarded to public network 204. If WARP 210 may forward the message, WARP 210 generates a mobile-originated message containing the text of the message from application 232. WARP 210 then communicates the mobile-originated message to public network 204 through SS7-IP interworking unit 238.

Figure 5:
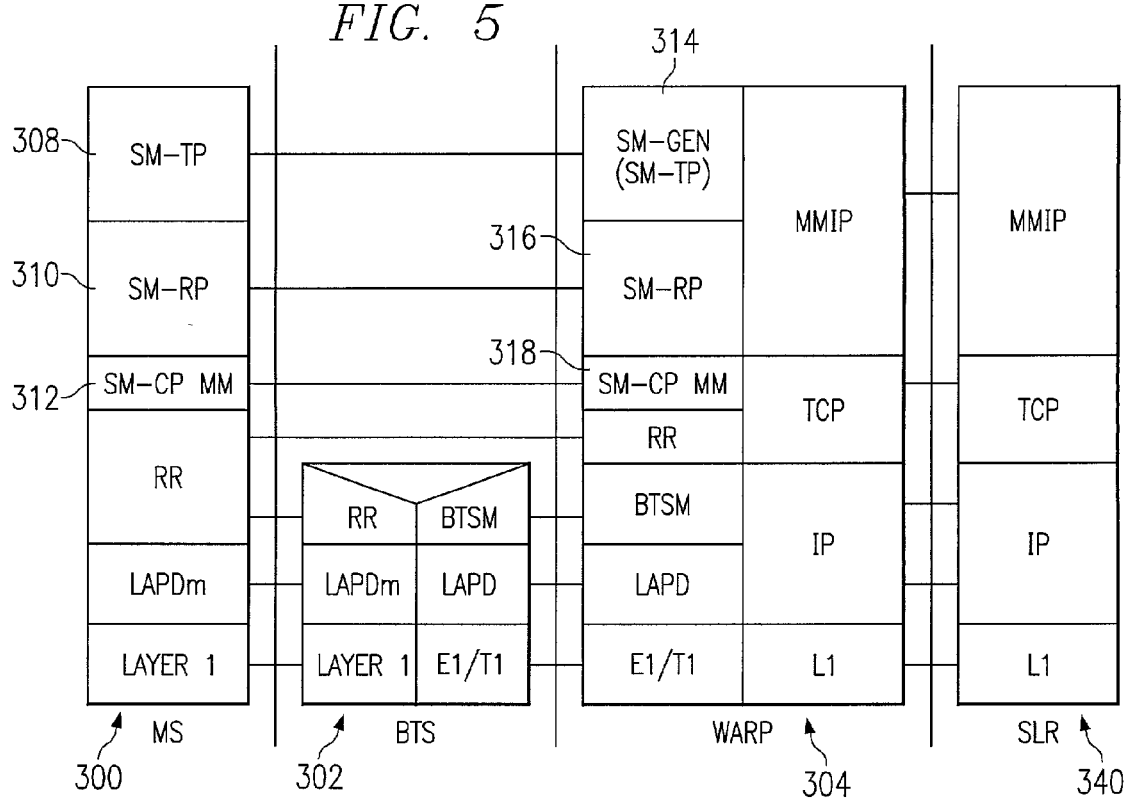
FIG. 5 is a block diagram illustrating an exemplary protocol architecture for delivering a voice mail user notification message to a mobile station in a private network constructed according to the teachings of the present invention.

FIG. 5 is a block diagram illustrating an exemplary protocol architecture for delivering a voice mail user notification message to mobile station 206 in private network 202 constructed according to the teachings of the present invention. In the illustrated embodiment, subscriber location register 230 has an associated protocol stack 340.

Layers 308–312 in mobile station 206 and layers 314–318 in WARP 210 facilitate the communication of voice mail user notification messages to mobile station 206. For example, when WARP 210 receives a message from gatekeeper 215 and/or gateway 216 informing WARP 210 that voice mail device 222 has received a voice message, WARP 210 may communicate with subscriber location register 230. If and when subscriber location register 230 instructs WARP 210 to communicate a voice mail indicator message to mobile station 206, WARP 210 generates a mobile-terminated message using layers 314–318, and WARP 210 communicates the message to mobile station 206 through base station 208.

Figure 6:
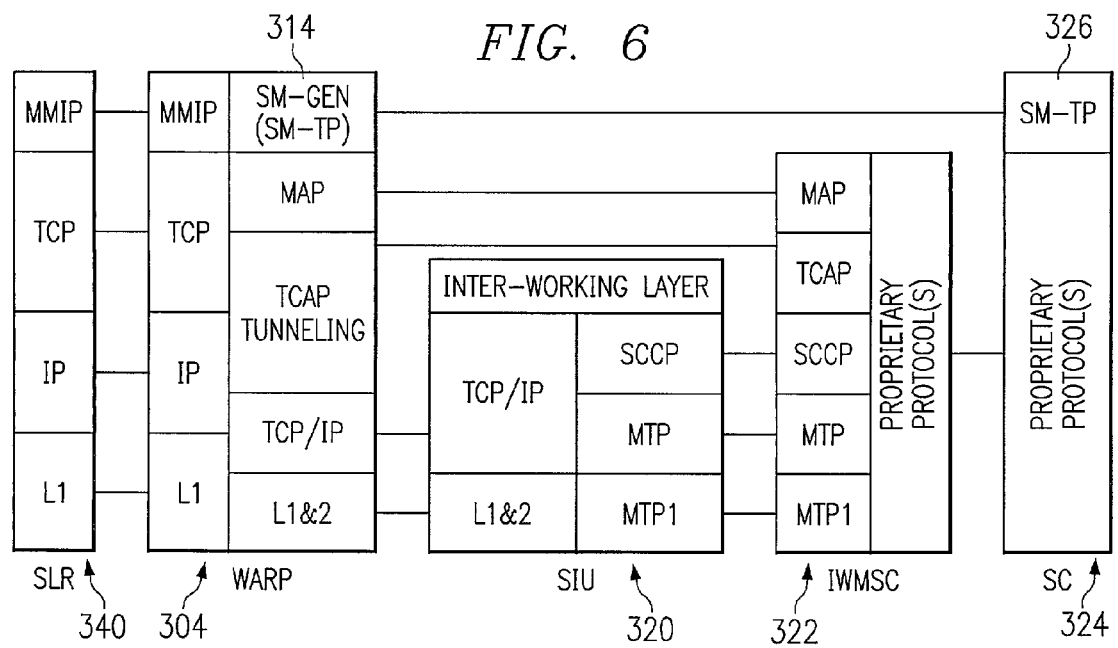
FIG. 6 is a block diagram illustrating an exemplary protocol architecture for delivering a voice mail user notification message to a mobile station in a public network constructed according to the teachings of the present invention.

FIG. 6 is a block diagram illustrating an exemplary protocol architecture for delivering a voice mail user notification message to mobile station 206 in public network 204 constructed according to the teachings of the present invention. Layer 314 in WARP 210 and layer 326 in service center 240 facilitate the communication of voice mail user notification messages between private network 202 and public network 204. For example, if mobile station 206 fails to acknowledge a mobile-terminated message generated and communicated to mobile station 206 by WARP 210, WARP 210 may generate and communicate a mobile-originated message to service center 240. The mobile-originated message may, for example, inform the subscriber that voice mail device 222 has received a voice message for telephone 220 associated with mobile station 206. Service center 240 may then attempt to deliver the message to mobile station 206 using public network 204.

FIG. 7 is a flow diagram illustrating an exemplary method 700 for delivering a user notification message to mobile station 206 according to the teachings of the present invention. Although method 700 is described as it related to system 200 of FIG. 2, the same or similar method may be used by system 100 of FIG. 1 or any other system.

Private network 202 receives information for a mobile station 206 at step 702. This may include, for example, an application 232 generating or receiving the information, gatekeeper 215 and/or gateway 216 generating the information after voice mail device 222 receives a voice message, or public network 204 communicating the information to private network 202. Private network 202 generates a mobile-terminated message containing the information at step 704. This may include, for example, WARP 210 generating a GSM SMS mobile-terminated message containing the information. Private network 202 communicates the mobile-terminated message to mobile station 206 at step 706. This may include, for example, WARP 210 communicating the mobile-terminated message to base station 208, and base station 208 communicating the message to mobile station 206 over wireless interface 224.

Private network 202 determines whether mobile station 206 acknowledges successful receipt of the mobile-terminated message at step 708. This may include, for example, WARP 210 determining whether mobile station 206 communicates an acknowledgement message to WARP 210 over wireless interface 224. If mobile station 206 acknowledges successful receipt of the message, method 700 ends. Otherwise, when mobile station 206 fails to acknowledge successful receipt of the mobile-terminated message, private network 202 determines whether to forward the information to public network 204 at step 710. This may include, for example, WARP 210 determining whether to forward the message based on a flag in the information received from application 232, gatekeeper 215, gateway 216, and/or subscriber location register 230.

If WARP 210 determines that it will not forward the message, method 700 ends. Otherwise, private network 202 generates a mobile-originated message containing the information at step 712. This may include, for example, WARP 210 generating a GSM SMS mobile-originated message. Private network 202 communicates the mobile-originated message to public network 204 at step 714. This may include, for example, WARP 210 communicating the message to service center 240 through SS7-IP interworking unit 238 and interworking mobile switching center 242. Service center 240 may then attempt to deliver the message to mobile station 206 through public network 204.

Although FIG. 7 illustrates one example of a method 700 for delivering a user notification message to mobile station 206, various changes may be made to method 700 without departing from the scope of the present invention. For example, private network 202 may forward all unsuccessfully delivered messages to public network 204, skipping step 710. Also, private network 202 could make multiple attempts to deliver the mobile-terminated message to mobile station 206, repeating steps 706 and/or 708. Other changes may be made to method 700 without departing from the scope of the present invention.

FIG. 8 is a flow diagram illustrating an exemplary method 800 for delivering a user notification from an application 232 to mobile station 206 according to the teachings of the present invention. Although method 800 is described as it related to system 200 of FIG. 2, the same or similar method may be used by system 100 of FIG. 1 or any other system.

An application 232 generates a text message for mobile station 206 at step 802. This may include, for example, a calendar or task program generating a reminder message, an electronic mail program generating a "message received" message, or a subscriber entering the text message through a Web-based interface. Integrated communications server 214 communicates the text message to WARP 210 at step 804. This may include, for example, integrated communications server 214 encapsulating the text message into an MMIP message and communicating the MMIP message to WARP 210 over packet network 212. WARP 210 generates one or more messages for mobile station 208 at step 806. This may include, for example, WARP 210 extracting the text message from the MMIP message and encapsulating the text message into a GSM SMS mobile-terminated message and/or a mobile-originated message. WARP 210 communicates the message to mobile station 206 at step 808. This may include, for example, WARP 210 communicating the mobile-terminated message to mobile station 206 through base station 208, and/or WARP 210 communicating the mobile-originated message to mobile station 206 through public network 204.

Figure 9:
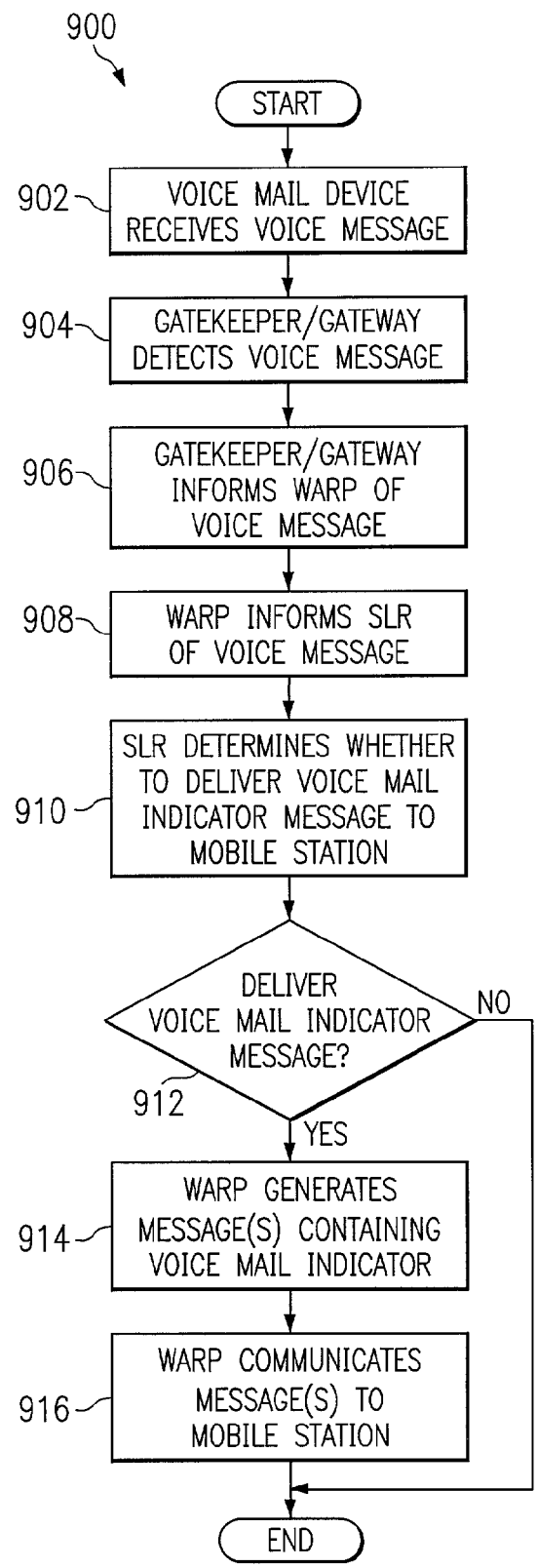
FIG. 9 is a flow diagram illustrating an exemplary method for delivering a voice mail user notification message to a mobile station according to the teachings of the present invention.

FIG. 9 is a flow diagram illustrating an exemplary method 900 for delivering a voice mail user notification message to mobile station 206 according to the teachings of the present invention. Although method 900 is described as it related to system 200 of FIG. 2, the same or similar method may be used by system 100 of FIG. 1 or any other system.

Voice mail device 222 receives a voice message at step 902. This may include, for example, voice mail device 222 receiving a voice message for a telephone 220 associated with a mobile station 206. Gatekeeper 215 and/or gateway 216 detects the voice message at step 904. This may include, for example, gatekeeper 215 and/or gateway 216 receiving an indication from voice mail device 222 that a voice message has been received, or gatekeeper 215 and/or gateway 216 polling voice mail device 222 and determining that a voice message has been received.

Gatekeeper 215 and/or gateway 216 informs WARP 210 of the voice message at step 906. This may include, for example, gatekeeper 215 and/or gateway 216 generating and communicating an ITU-T H.450 MWI message to WARP 210. WARP 210 informs subscriber location register 230 of the voice message at step 908. This may include, for example, WARP 210 generating and communicating an MMIP message to subscriber location register 230.

Subscriber location register 230 determines whether a voice mail indication message should be delivered to mobile station 206 at step 910. This may include, for example, subscriber location register 230 determining whether the subscriber is authorized to receive voice mail indication messages. This may also include subscriber location register 230 determining whether the subscriber has chosen to receive voice mail indication messages for every voice message, or whether the subscriber has chosen to receive voice mail indication messages whenever a new message arrives and the subscriber previously listened to and/or cleared all previous messages.

WARP 210 identifies whether subscriber location register 230 has determined that a message should be sent to mobile station 206 at step 912. This may include, for example, WARP 210 using the response from subscriber location register 230 to determine whether a message should be sent to mobile station 206. If WARP 210 will not send a message to mobile station 206, method 900 ends. Otherwise, WARP 210 generates one or more messages for mobile station 206 at step 914. This may include, for example, WARP 210 generating a GSM SMS mobile-terminated message and/or a mobile-originated message containing a voice mail indicator, the phone number of the caller who left the voice message, the time the voice message was received, and/or any other information. WARP 210 communicates the message to mobile station 206 at step 916. This may include, for example, WARP 210 communicating the mobile-terminated message to mobile station 206 through base station 208, and/or WARP 210 communicating the mobile-originated message to mobile station 206 through public network 204.

Although FIG. 9 illustrates one example of a method 900 for delivering a voice mail indication message to mobile station 206, various changes may be made to method 900 without departing from the scope of the present invention. For example, if system 200 allows mobile station 206 to receive all voice mail indication messages, WARP 210 could generate and communicate a message to mobile station 206 without having subscriber location register 230 determine if a mobile station 206 is authorized to receive the message.

Although the present invention has been described with several embodiments, a number of changes, substitutions, variations, alterations, and modifications may be suggested to one skilled in the art, and it is intended that the invention encompass all such changes, substitutions, variations, alterations, and modifications that fall within the spirit and scope of the appended claims.

What is claimed is:

1. A method for providing user notification, comprising:
generating a mobile-terminated message containing at least a portion of information to be provided to a mobile station;
communicating the mobile-terminated message to a base station, the base station operable to communicate the mobile-terminated message to the mobile station;
determining that the mobile station fails to acknowledge successful receipt of the mobile-terminated message; and
in response to the determination that the mobile station failed to acknowledge receipt of the mobile-terminated message, generating a mobile-originated message containing at least a portion of the information for communication to a public network, the public network operable to communicate the mobile-originated message to the mobile station.

2. The method of claim 1, wherein the mobile-terminated message and the mobile-originated message comprise Global System for Mobile communication (GSM) Short Message Service messages.

3. The method of claim 1, further comprising receiving the information to be communicated to the mobile station from an application.

4. The method of claim 3, wherein the information comprises a text message from the application.

5. The method of claim 1, further comprising:
receiving a signal indicating that a voice mail device has received a voice message for a telephone associated with the mobile station; and
generating a text message indicating that the voice mail device has received the voice message, the text message comprising the information to be provided to the mobile station.

6. The method of claim 1, further comprising receiving from a subscriber location register an approval to communicate the information to the mobile station.

7. The method of claim 1, wherein the base station comprises one of a plurality of base stations;
further comprising tracking at least one of the plurality of base stations serving the mobile station; and
wherein communicating the mobile-terminated message to the base station comprises communicating the mobile-terminated message to the at least one base station serving the mobile station.

8. The method of claim 1, further comprising:
determining whether to forward the information to the public network; and
wherein communicating the mobile-originated message to the public network comprises communicating the mobile-originated message to the public network based on the forwarding determination.

9. The method of claim 1, further comprising:
interworking the mobile-originated message between a first protocol and a second protocol; and
wherein the public network receives the mobile-originated message using the second protocol.

10. The method of claim 9, wherein:
the first protocol comprises art Internet Protocol; and
the second protocol comprises a Signaling System 7 protocol.

11. A system for providing user notification, comprising:
at least one computer processable medium; and
logic encoded on the at least one computer processable medium, the logic operable to:
generate a mobile-terminated message containing at least a portion of information to be provided to a mobile station;
communicate the mobile-terminated message to a base station, the base station operable to communicate the mobile-terminated message to the mobile station;
determine that the mobile station fails to acknowledge successful receipt of the mobile-terminated message; and
generate, in response to the determination that the mobile station fails to acknowledge successful receipt of the mobile-terminated message, a mobile-originated message containing at least a portion of the information for communication to a public network the public network operable to communicate the mobile-originated message to the mobile station.

12. The system of claim 11, wherein the mobile-terminated message and the mobile-originated message comprise Global System for Mobile communication (GSM) Short Message Service messages.

13. The system of claim 11, wherein the information to be communicated to the mobile station comprises a text message from an application.

14. The system of claim 11, wherein the logic is further operable to:
receive a signal indicating that a voice mail device has received a voice message for a telephone associated with the mobile station; and
generate a text message indicating that the voice mail device has received the voice message, the text message comprising die information to be provided to the mobile station.

15. The system of claim 14, wherein the logic is further operable to:
inform a subscriber location register that the voice mail device has received the voice message; and
receive from the subscriber location register an approval to communicate the text message to the mobile station.

16. The system of claim 11, wherein:
the base station comprises one of a plurality of base stations;
the software is further operable to track at least one of the plurality of base stations serving the mobile station; and
the logic is operable to communicate the mobile-terminated message to the at least one base station serving the mobile station.

17. The system of claim 11, wherein:
the logic is further operable to determine whether to forward the information to the public network; and
the logic is operable to communicate the mobile-originated message to the public network based on the forwarding determination.

18. A system for user notification, comprising:
a memory operable to store information to be provided to a mobile station; and
at least one processor operable to:
generate a mobile-terminated message containing at least a portion of the information to be provided to the mobile station;
communicate the mobile-terminated message to a base station, the base station operable to communicate the mobile-terminated message to the mobile station;
determine that the mobile station fails to acknowledge successful receipt of the mobile-terminated message; and
generate, in response to determination that the mobile station fails to acknowledge successful receipt of the mobile-terminated message, a mobile-originated message containing at least a portion of the information for communication to a public network if and only if the public network operable to communicate the mobile-originated message to the mobile station.

19. The system of claim 18, wherein the mobile-terminated message and the mobile-originated message comprise Global System for Mobile communication (GSM) Short Message Service messages.

20. The system of claim 18, wherein the information to be communicated to the mobile station comprises a text message from an application.

21. The system of claim 18, wherein the processor is further operable to:
receive a signal indicating that a voice mail device has received a voice message for a telephone associated with the mobile station; and
generate a text message indicating that the voice mail device has received the voice message, the text message comprising the information to be provided to the mobile station.

22. The system of claim 21, wherein the processor is further operable to:
inform a subscriber location register that the voice mail device has received the voice message; and
receive from the subscriber location register an approval to communicate the text information to the mobile station.

23. The system of claim 18, wherein:
the base station comprises one of a plurality of base stations;
the memory is further operable to store an identification of at least one of the plurality of base stations serving the mobile station; and
the processor is operable to communicate the mobile-terminated message to the at least one base station serving the mobile station.

24. The system of claim 18, wherein:
the processor is further operable to determine whether to forward the information to the public network; and
the processor is operable to communicate the mobile-originated message to the public network based on the forwarding determination.

25. A system for user notification, comprising:
at least one base station operable to communicate with a mobile station;
a wireless platform coupled to the base station, the wireless platform operable to communicate with the mobile station through the base station, the wireless platform operable also operable to perform an interworking function to facilitate communication between the mobile station and a packet network;
a communications server operable to communicate with the wireless platform over the packet network and to execute at least one application, the application operable to generate a first notification message to be provided to the mobile station, the communications server also operable to communicate the first notification message to the wireless platform;
a gateway operable to communicate with the wireless platform over the packet network and with a telephone system;

a voice mail device operable to receive and store a voice message for a telephone, the telephone associated with the mobile station and operable to communicate with the telephone system;

a gatekeeper operable to communicate with the gateway, at least one of the gatekeeper and the gateway operable to communicate a signal to the wireless platform indicating that the voice mail device has received the voice message, the wireless platform operable to generate a second notification message indicating that the voice mail device has received the voice message in response to receiving the signal from at least one of the gatekeeper and the gateway;

the wireless platform operable to generate a mobile-terminated message containing at least one of the first notification message and the second notification message, the wireless platform also operable to communicate the mobile-terminated message to the base station and to determine if the mobile station acknowledges successful receipt of the mobile-terminated message; and the wireless platform further operable to generate a mobile-originated message containing at least one of the first notification message and the second notification message for communication to a public network if the mobile station fails to acknowledge successful receipt of the mobile-terminated message, the public network operable to communicate the mobile-originated message to the mobile station.

26. A method for providing user notification, comprising:

receiving a first notification message from an application;

generating a first mobile-terminated message containing at least a portion of the first notification message;

communicating the first mobile-terminated message to a base station, the base station operable to communicate the first mobile-terminated message to a mobile station;

determining whether the mobile station acknowledges successful receipt of the first mobile-terminated message;

determining whether the first notification message may be forwarded to a public network;

generating a first mobile-originated message containing at least a portion of the first notification message for communication to the public network if the mobile station fails to acknowledge successful receipt of the first mobile-terminated message and the first notification message may be forwarded to the public network;

receiving a signal indicating that a voice mail device has received a voice message for a telephone associated with the mobile station;

generating a second mobile-terminated message containing a second notification message indicating that the voice mail device has received the voice message;

communicating the second mobile-terminated message to the base station;

determining whether the mobile station acknowledges successful receipt of the second mobile-terminated message;

determining whether the second notification message may be forwarded to the public network; and generating a second mobile-originated message containing the second notification message for communication to the public network if the mobile station fails to acknowledge successful receipt of the second mobile-terminated message and the second notification message may be forwarded to the public network.

27. A system for providing user notification, comprising:

at least one computer processable medium; and logic encoded on the at least one computer processable medium, the logic operable to:

receive a first notification message from an application;

generate a first mobile-terminated message containing at least a portion of the first notification message;

communicate the first mobile-terminated message to a base station, the base station operable to communicate the first mobile-terminated message to a mobile station;

determine whether the mobile station acknowledges successful receipt of the first mobile-terminated message;

determine whether the first notification message may be forwarded to a public network;

generate a first mobile-originated message containing at least a portion of the first notification message for communication to the public network if the mobile station fails to acknowledge successful receipt of the first mobile-terminated message and the first notification message may be forwarded to the public network;

receive a signal indicating that a voice mail device has received a voice message for a telephone associated with the mobile station;

generate a second mobile-terminated message containing a second notification message indicating that the voice mail device has received the voice message;

communicate the second mobile-terminated message to the base station;

determine whether the mobile station acknowledges successful receipt of the second mobile-terminated message;

determine whether the second notification message may be forwarded to the public network; and generate a second mobile-originated message containing the second notification message for communication to the public network if the mobile station fails to acknowledge successful receipt of the second mobile-terminated message and the second notification message may be forwarded to the public network.

28. A system for user notification, comprising:

a memory operable to store information to be provided to a mobile station; and at least one processor operable to:

receive a first notification message from an application;

generate a first mobile-terminated message containing at least a portion of the first notification message;

communicate the first mobile-terminated message to a base station, the base station operable to communicate the first mobile-terminated message to a mobile station;

determine whether the mobile station acknowledges successful receipt of the first mobile-terminated message;

determine whether the first notification message may be forwarded to a public network;

generate a first mobile-originated message containing at least a portion of the first notification message for communication to the public network if the mobile station fails to acknowledge successful receipt of the first mobile-terminated message and the first notification message may be forwarded to the public network;

receive a signal indicating that a voice mail device has received a voice message for a telephone associated with the mobile station;
generate a second mobile-terminated message containing a second notification message indicating that the voice mail device has received the voice message;
communicate the second mobile-terminated message to the base station;
determine whether the mobile station acknowledges successful receipt of the second mobile-terminated message;
determine whether the second notification message may be forwarded to the public network; and
generate a second mobile-originated message containing the second notification message for communication to the public network if the mobile station fails to acknowledge successful receipt of the second mobile-terminated message and the second notification message may be forwarded to the public network.

* * * * *